US00RE47202E

(19) United States
(12) Reissued Patent
Sun et al.

(10) Patent Number: US RE47,202 E
(45) Date of Reissued Patent: *Jan. 8, 2019

(54) METHOD AND APPARATUS FOR CONTROLLING LOOP FILTERING OR POST FILTERING IN BLOCK BASED MOTION COMPENSATIONED VIDEO CODING

(71) Applicant: Dolby Laboratories Licensing Corporation, San Francisco, CA (US)

(72) Inventors: Shijun Sun, Vancouver, WA (US); Shawmin Lei, Camas, WA (US)

(73) Assignee: Dolby Laboratories Licensing Corporation, San Francisco, CA (US)

( * ) Notice: This patent is subject to a terminal disclaimer.

(21) Appl. No.: 15/651,868

(22) Filed: Jul. 17, 2017

Related U.S. Patent Documents

Reissue of:
(64) Patent No.: 7,440,501
Issued: Oct. 21, 2008
Appl. No.: 11/105,729
Filed: Apr. 13, 2005

U.S. Applications:
(60) Continuation of application No. 14/512,067, filed on Oct. 10, 2014, now Pat. No. Re. 46,491, which is an
(Continued)

(51) Int. Cl.
*H04B 1/66* (2006.01)
*H04N 19/117* (2014.01)
(Continued)

(52) U.S. Cl.
CPC ..... *H04N 19/117* (2014.11); *H04N 19/136* (2014.11); *H04N 19/139* (2014.11);
(Continued)

(58) Field of Classification Search
CPC .. H04N 19/117; H04N 19/577; H04N 19/139; H04N 19/573; H04N 19/895;
(Continued)

(56) References Cited

U.S. PATENT DOCUMENTS 5,072,293 A 12/1991 De Haan et al.
5,126,841 A * 6/1992 Tanaka et al. ..... 375/240.16
(Continued)

FOREIGN PATENT DOCUMENTS

CA 2374523 7/2001
EP 0 777 388 A2 12/1995
(Continued)

OTHER PUBLICATIONS

"Index of /av-arch/video-site/0109.sub.--San", Sep. 4, 2001, pp. 1-4, XP002606104, Retrieved from the Internet URL:http://ftp.itu3.int/av-arch/video-site/0109.sub.--San [retrieved on Oct 4, 2005].
(Continued)

*Primary Examiner* — Adam L Basehoar

(57) ABSTRACT

Adjacent blocks are identified in an image. Coding parameters for the adjacent blocks are identified. Deblock filtering between the identified adjacent blocks is skipped if the coding parameters for the identified adjacent blocks are similar and not skipped if the coding parameters for the identified adjacent blocks are substantially different.

1 Claim, 5 Drawing Sheets

Related U.S. Application Data application for the reissue of Pat. No. 7,440,501, and a continuation of application No. 13/954,817, filed on Jul. 30, 2013, now Pat. No. Re. 45,250, which is an application for the reissue of Pat. No. 7,440,501, and a continuation of application No. 13/495,944, filed on Jun. 13, 2012, now Pat. No. Re. 44,497, which is an application for the reissue of Pat. No. 7,440,501, and a continuation of application No. 12/908,690, filed on Oct. 20, 2010, now Pat. No. Re. 43,628, which is an application for the reissue of Pat. No. 7,440,501, which is a division of application No. 09/817,701, filed on Mar. 26, 2001, now Pat. No. 6,931,063.

(51) Int. Cl.

| | |
|---|---|
| ***H04N 19/577*** | (2014.01) |
| ***H04N 19/196*** | (2014.01) |
| ***H04N 19/61*** | (2014.01) |
| ***H04N 19/136*** | (2014.01) |
| ***H04N 19/80*** | (2014.01) |
| ***H04N 19/82*** | (2014.01) |
| ***H04N 19/527*** | (2014.01) |
| ***H04N 19/895*** | (2014.01) |
| ***H04N 19/573*** | (2014.01) |
| ***H04N 19/139*** | (2014.01) |
| *H04N 19/176* | (2014.01) |
| *H04N 19/86* | (2014.01) |
| *H04N 19/60* | (2014.01) |
| *H04N 19/132* | (2014.01) |
| *G06T 5/00* | (2006.01) |

(52) U.S. Cl.

CPC ..... *H04N 19/196* (2014.11); *H04N 19/527* (2014.11); *H04N 19/573* (2014.11); *H04N 19/577* (2014.11); *H04N 19/61* (2014.11); *H04N 19/80* (2014.11); *H04N 19/82* (2014.11); *H04N 19/895* (2014.11); *G06T 5/001* (2013.01); *H04N 19/132* (2014.11); *H04N 19/176* (2014.11); *H04N 19/60* (2014.11); *H04N 19/86* (2014.11)

(58) Field of Classification Search

CPC .... H04N 19/196; H04N 19/527; H04N 19/82; H04N 19/61; H04N 19/136; H04N 19/80; H04N 19/60; H04N 19/132; H04N 19/86; H04N 19/176; G06T 5/001

USPC ..... 375/240.16, 240.18, 240.25, 240.29; 382/233, 236, 239, 254, 264, 266, 268, 382/269

See application file for complete search history.

(56) References Cited

U.S. PATENT DOCUMENTS

| | | | | |
|---|---|---|---|---|
| 5,329,318 | A | 7/1994 | Keith | |
| 5,367,385 | A | 11/1994 | Yuan | |
| 5,473,384 | A | 12/1995 | Jayant et al. | |
| 5,479,211 | A | 12/1995 | Fukuda | |
| 5,565,921 | A | 10/1996 | Sasaki et al. | |
| 5,654,759 | A | 8/1997 | Augenbraun et al. | |
| 5,731,840 | A | 3/1998 | Kikuchi et al. | |
| 5,737,019 | A * | 4/1998 | Kim | 375/240.25 |
| 5,768,433 | A | 6/1998 | Bolton | |
| 5,787,204 | A | 7/1998 | Fukuda | |
| 5,852,682 | A | 12/1998 | Kim | |
| 5,933,542 | A | 8/1999 | Chang et al. | |
| 5,949,908 | A | 9/1999 | Sugahara | |
| 5,974,196 | A | 10/1999 | Chang et al. | |
| 5,987,184 | A | 11/1999 | Kweon et al. | |
| 6,041,145 | A | 3/2000 | Hayashi et al. | |
| 6,044,177 | A | 3/2000 | Herley | |
| 6,057,884 | A | 5/2000 | Chen et al. | |
| 6,104,434 | A | 8/2000 | Nakagawa et al. | |
| 6,115,503 | A | 9/2000 | Kaup | |
| 6,144,700 | A | 11/2000 | Kim | |
| 6,160,503 | A * | 12/2000 | Andrews et al. | 341/94 |
| 6,167,157 | A | 12/2000 | Sugahara | |
| 6,263,026 | B1 | 7/2001 | Je-Chang et al. | |
| 6,424,676 | B1 | 7/2002 | Kono et al. | |
| 6,618,445 | B1 * | 9/2003 | Peng et al. | 375/240.25 |
| 6,665,346 | B1 | 12/2003 | Lee et al. | |
| 6,748,113 | B1 | 6/2004 | Kondo et al. | |
| 6,907,079 | B2 | 6/2005 | Gomila et al. | |
| 6,931,063 | B2 | 8/2005 | Sun et al. | |
| 7,120,197 | B2 | 10/2006 | Lin et al. | |
| 7,319,415 | B2 | 1/2008 | Gomila | |
| 7,440,501 | B2 | 10/2008 | Sun et al. | |
| 7,627,034 | B2 | 12/2009 | Park et al. | |
| RE43,628 | E | 9/2012 | Sun et al. | |
| RE44,497 | E | 9/2013 | Sun et al. | |
| 8,600,179 | B2 | 12/2013 | Park et al. | |
| RE45,250 | E | 11/2014 | Sun et al. | |
| 9,942,573 | B2 * | 4/2018 | Sadafale | H04N 19/86 |
| 2001/0017944 | A1 | 8/2001 | Kalevo et al. | |
| 2002/0136303 | A1 | 9/2002 | Sun et al. | |
| 2004/0101059 | A1 | 5/2004 | Joch et al. | |
| 2004/0184549 | A1 * | 9/2004 | Webb | H04N 19/174 375/240.29 |
| 2004/0190626 | A1 | 9/2004 | Sun et al. | |
| 2005/0002646 | A1 | 1/2005 | Sato | |
| 2005/0053288 | A1 * | 3/2005 | Srinivasan | H04N 19/00 382/233 |
| 2006/0146941 | A1 | 7/2006 | Cha et al. | |
| 2007/0160133 | A1 | 7/2007 | Bao et al. | |
| 2008/0095244 | A1 * | 4/2008 | Kim | H04N 19/527 375/240.24 |
| 2008/0240252 | A1 | 10/2008 | He | |

FOREIGN PATENT DOCUMENTS

| | | |
|---|---|---|
| EP | 0 714 209 A2 | 5/1996 |
| EP | 0714209 | 5/1996 |
| EP | 0 777 388 A2 | 4/1997 |
| EP | 0777388 | 6/1997 |
| EP | 0 838 955 A2 | 7/1997 |
| EP | 0 838 955 A2 | 4/1998 |
| EP | 0838955 | 4/1998 |
| JP | 05-227518 | 9/1993 |
| JP | 08-205178 | 8/1996 |
| JP | 08-265762 | 10/1996 |
| JP | 10-093966 | 4/1998 |
| JP | 10-191351 | 7/1998 |
| JP | 11-018085 | 1/1999 |
| JP | 11-275584 | 10/1999 |
| JP | 2000-059769 | 2/2000 |
| JP | 2000-299864 | 10/2000 |
| JP | 2001-094996 | 4/2001 |
| JP | 2001-204029 | 7/2001 |
| JP | 2001-224031 | 8/2001 |
| JP | 2004-328634 | 11/2004 |
| JP | 2005-503737 | 2/2005 |
| JP | 2006-191576 | 7/2006 |
| KR | 10-1997-0078645 | 12/1997 |
| WO | WO2000/014685 | 3/2000 |

OTHER PUBLICATIONS

"Working Draft 1.0 of 14496-10: 200x/AMD1 Scalable Video Coding" ITU Study Group 16—Video Coding Experts Group—ISO/IEC MPEG & ITU-T VCEG/ISO/IEC JTC1/SC29/ WG11 and ITU-T SG16 Q6), No. N6901, Feb. 5, 2005 (Feb. 5, 2005), XP030013621.

"Working Draft 4 of ISO/IEC 14496-10: 200x/Amd.3 Scalable Video Coding" ITU Study Group 16—Video Coding Experts Group—ISO/IEC MPEG & ITU-T VCEG(ISO/IEC JTC1/SC29/WG11 and ITU-T SG16 Q6), No. N7555. Oct. 28, 2005 (Oct. 28, 2005), XP030014100 p. 118-p. 119.

(56) References Cited

OTHER PUBLICATIONS

Bjontegaard G.: "H.26L Test Model Long Term No. 7 (TML-7) draft 0" ITU—Telecommunications Standardization Sector, Study Group 16, Video Coding Experts Group; Document VCEG-M81, May 3, 2001; Austin Texas, USA Apr. 2-4, 2001.
Bjontegaard, Gisle (Editor), "H.26L Test Model Long Term No. 6 (TML-6) draft0", ITU Telecommunications Standardization Sector, Study Group 16, Video Coding Experts Group (VCEG), 12.sup.TH meeting, Eibsee, Germany, Jan. 9-12, 2001.
Derviaux C et al.: "Blocking Artifact Reduction of DCT Coded Image Sequences Using a Visually Adaptive Postprocessing" Proceedings of the International Conference on Image Processing (ICIP), Lausanne, Sep. 16-19, 1996, New York, IEEE, US, vol. 1, Sep. 16, 1996 pp. 5-8.
Francois E. et al: "Extended Spatial Scalability" International Organisation for Standardisation Organisation International De Normalisation, ISO/IEC JTC1/SC29/WG11, Coding of Moving Pictures and Audio, ISO/IEC JTC1/SC29/WG11, Coding of Moving Pirctures and Audio, ISO/IEC JTC1/SC29/WG11, MPEGG2005/M11669 Jan. 2005 Hong Kong.
Han W. et al.: "Response of SVC CE-3: Interlayer prediction" ITU Study Group 16—Video Coding Experts Group—ISO/IEC MPEG & ITU-T VCEG (ISO/IEC JTC1/SC29/WG11 and ITU-T SG16 Q6), No. M11585, Jan. 11, 2005 (Jan. 11, 2005), XP030040330.
He Y; Wu F; Li S; Zhong 7; Yang S: "H.26L—Based Fine Granularity Scalable Video Coding" Proceedings—IEEE International Symposium on Circuits and Systems, vol. 4, 2002, pp. IV-548-IV-551, XP002593544 ISSN:0271-4310.
Kim C. et al.: "Simplified Loop Filter for Mobile Service (VCEG-M43)" ITU—Telecommunication Standardization Sector Study Group 16, VCEG-M43, Austin, Texas, Apr. 2-4, 2001, generated Mar. 28, 2001.
Kim S. D. et al.: "A Deblocking Filter with Two Separate Modes in Block-Based Video Coding", IEEE Transactions on Circuits and Systems for Video Technology, vol. 9, No. 1, Feb. 1999; pp. 156-160.
Lee Y. L. et al.: "Loop-filtering and post-filtering for low bit-rates moving picture coding," 1999. ICIP 99. Proceedings,1999 International Conference on Kobe, Japan Oct. 24-28, 1999, Piscataway, NJ, USA, IEEE, US, vol. 1, pp. 94-98, Oct. 24, 1999.
List P. et al. "H.26L Test Model Long Term No. 8.40 (TML-8.4), Software Module: loop-filter.c" ITU—Telecommunications Standardization Sector Study Group 16, VCEG, [Online] Aug. 29, 2001, pp. 1-3, XP002440062, Santa Barbara, CA, USA.
List P. et al.: "Adaptive Deblocking Filter" IEEE Transactions on Circuits and Systems for Video Technology, IEEE Service Center, Piscataway, NJ, US LINKD-DOI: 10.1109/TCSVT. 2003.815175, vol. 13, No. 7, Jul. 1, 2003 (Jul. 1, 2003). pp. 614-619, XP01122109.
List P.: "Report of the Ad Hoc Committee on Loop Filter Improvement (VCEG-N08)" ITU Telecommunications Standardization Sector Study Group 16, VCEG-N008, [Online] Sep. 4, 2001, pp. 1-3, XP002347724 Santa Barbara, CA, USA, generated Aug. 8, 2001.
Meier T. et al.: "Reduction of Blocking Artifacts in Image and Video Coding", IEEE Transactions on Circuits and Systems for Video Technology, vol. 9, No. 3, Apr. 1999; pp. 490-499.
Park H. W. et al.: "A Postprocessing Method for Reducing Quantization Effects in Low Bit-Rate Moving Picture Coding", IEEE Transactions on Circuits and Systems for Video Technology, IEEE Inc. New York, US, vol. 9, No. 1, Feb. 1999, pp. 161-171.
Suehring, Karsten, "Release of reference software TML 8.4", tml84changes.txt, Sep. 3, 2001, XP002606232, Retrieved from the Internet: URL:http//wftp3.itu.int/av-arch/video-site/h26L/older.sub.--tml/tm184chan- ges.txt [retrieved on Oct. 20, 2010].
Sun S. et al.: "Extended Spatial Scalability with Picture-Level Adaptation," ITU Study Group 16—Video Coding Experts Group—ISO/IEC MPEG & ITU-T VCEG(ISO/IEC JTC1/SC29/VVG11 and ITU-T SG16 Q6), No. JVT-0008, Apr. 13, 2005 (Apr. 13, 2005), XP030005956.
Sun S. et al.: "Improved TML Loop Filter with Lower Complexity (VCEG-N17)" ITU Telecommunications Standardization Sector Study Group 16, VCEG-N17, [Online] Sep. 24, 2001, pp. 1-8, XP002347725 Santa Barbara, CA USA, generated Aug. 14, 2001.
Sun S. et al.: "Loop Filter with Skip Mode (VCEG-M20)" ITU Telecommunications Standardization Sector Study Group 16, VCEG-M20, Apr. 2-4, 2001, pp. 1-8, XP002321426 Austin, Texas, USA, sections 1 + 2 with figure 1, generated Mar. 27, 2001.
Sun S.:"CE2 Part 2: Deblocking filter for I.sub.—BL Blocks Spatial Scalable Video Coding", ITU Study Group 16—Video Coding Experts Group—ISO/IEC MPEG & ITU-T VCEG(ISO/IEC JTC1/SC29/WG11 and ITU-T SG16 Q6), No. JVT-P013r1, Jul. 28, 2005 (Jul. 28, 2005), XP030006055.
Turkowski K.: "Filters for Common Resampling Tasks," Graphics Gems I, Academic Pres, Apple Computer, Apr. 1990.
Video & JVT, Description of Core Experiments in SVC, International Organisation for Standardisation, Organisation International De Normalisation, Coding of Moving Pictures and Audio, ISO/IEC JTC1/SC29/WG11/N6898, Hong Kong, Jan. 2005.
Video Coding Experts Group (Question 15) Eleventh Meeting: ITU—Telecommunications Standardization Sector, dated Oct. 25, 2000, 35 pages.
European Search Report for European Application No. EP 02 00 6295, dated Apr. 20, 2005.

* cited by examiner

110

TABLE 1. COMPARISON BETWEEN TML AND THE PROPOSED LOOP FILTERING SCHEME

| VIDEO SEQUENCE | QP | BITRATE (bps) | | PSNR(Y) | | PSNR(U) | | PSNR(V) | | NEW LOOP FILTER RELATIVE TIME SAVING |
|---|---|---|---|---|---|---|---|---|---|---|
| | | TML | SLA | TML | SLA | TML | SLA | TML | SLA | |
| Akiyo_cif 300 FRAMES @ 30fps | 25 | 33151 | 32346 | 34.050 | 34.161 | 38.934 | 39.042 | 40.300 | 40.369 | 63.0% |
| | 30 | 22775 | 22295 | 30.797 | 30.920 | 36.610 | 36.964 | 38.680 | 38.771 | 68.2% |
| Foreman_cif 300 FRAMES @ 30fps | 25 | 165115 | 162740 | 30.835 | 31.006 | 38.124 | 38.174 | 38.966 | 39.030 | 43.1% |
| | 30 | 101357 | 100215 | 27.580 | 27.836 | 36.745 | 36.811 | 37.267 | 37.362 | 42.1% |
| Foreman_qcif 100 FRAMES @ 10fps | 25 | 28681 | 28677 | 29.822 | 29.931 | 37.586 | 37.631 | 37.773 | 37.938 | 38.4% |
| | 30 | 15999 | 15822 | 26.250 | 26.435 | 36.432 | 36.323 | 36.222 | 36.283 | 41.3% |
| Templete_cif 260 FRAMES @ 30fps | 25 | 336200 | 329115 | 28.277 | 28.490 | 33.982 | 34.143 | 36.009 | 36.184 | 45.3% |
| | 30 | 168133 | 159789 | 24.583 | 24.927 | 32.334 | 32.628 | 34.512 | 34.799 | 50.6% |

METHOD AND APPARATUS FOR CONTROLLING LOOP FILTERING OR POST FILTERING IN BLOCK BASED MOTION COMPENSATIONED VIDEO CODING

Matter enclosed in heavy brackets [ ] appears in the original patent but forms no part of this reissue specification; matter printed in italics indicates the additions made by reissue; a claim printed with strikethrough indicates that the claim was canceled, disclaimed, or held invalid by a prior post-patent action or proceeding.

*More than one reissue applications have been filed for the reissue of U.S. Pat. No. 7,440,501. The reissue applications are: patent application Ser. No. 12/908,690, filed on Oct. 20, 2010, now reissued as Pat. No. RE43,628; patent application Ser. No. 13/495,944, filed on Jun. 13, 2012, now reissued as Pat. No. RE44,497; patent application Ser. No. 13/954,817, filed on Jul. 30, 2013, now reissued as Pat. No. RE45,250; patent application Ser. No. 14/512,067, filed on Oct. 10, 2014, now reissued as Pat. No. RE46,491; patent application Ser. No. 14/512,165, filed on Oct. 10, 2014, now reissued as Pat. No. RE46,482; co-pending patent application Ser. No. 15/651,868, filed on Jul. 17, 2017; and co-pending patent application Ser. No. 15/651,879, filed on Jul. 17, 2017.*

This application *is a continuation reissue application of application Ser. No. 14/512,067, filed on Oct. 10, 2014 (now U.S. Pat. No. RE46,491), and is a reissue of U.S. Pat. No. 7,440,501. Patent application Ser. No. 14/512,067 is a continuation reissue application of application Ser. No. 13/954,817, filed on Jul. 30, 2013 (now U.S. Pat. No. RE45,250), and is a reissue of U.S. Pat. No. 7,440,501. Patent application Ser. No. 13/954,817 is a continuation reissue application of application Ser. No. 13/495,944, filed on Jun. 13, 2012 (now U.S. Pat. No. RE44,497), and a reissue of U.S. Pat. No. 7,440,501. Patent application Ser. No. 13/495,944 is a continuation reissue application of application Ser. No. 12/908,690, filed on Oct. 20, 2010 (now U.S. Pat. No. RE43,628), and a reissue of U.S. Pat. No. 7,440,501. Patent application Ser. No. 12/908,690 is a reissue of U.S. Pat. No. 7,440,501, which was filed as application Ser. No. 11/105,729 on Apr. 13, 2005, and* is a divisional [based on prior U.S.] *of application* Ser. No. 09/817,701, filed Mar. 26, 2001, now U.S. Pat. No. 6,931,063.

BACKGROUND

Block based motion compensated video coding is used in many video compression standards such as H.261, H.263, H263+, MPEG-1, MPEG-2, and H26L. The lossy compression process can create visual artifacts in the decoded images, referred to as image artifacts. Blocking artifacts occur along the block boundaries in an image and are caused by the coarse quantization of transform coefficients.

Image filtering techniques can be used to reduce artifacts in reconstructed images. Reconstructed images are the images produced after being inverse transformed and decoded. The rule of thumb in these techniques is that image edges should be preserved while the rest of the image is smoothed. Low pass filters are carefully chosen based on the characteristic of a particular pixel or set of pixels surrounding the image edges.

Non-correlated image pixels that extend across image block boundaries are specifically filtered to reduce blocking artifacts. However, this filtering can introduce blurring artifacts into the image. If there are little or no blocking artifacts between adjacent blocks, then low pass filtering needlessly incorporates blurring into the image while at the same time wasting processing resources.

The present invention addresses this and other problems associated with the prior art.

SUMMARY OF THE INVENTION

Adjacent blocks are identified in an image. Coding parameters for the adjacent blocks are identified. Deblock filtering between the identified adjacent blocks is skipped if the coding parameters for the identified adjacent blocks are similar and not skipped if the coding parameters for the identified adjacent blocks are substantially different.

DETAILED DESCRIPTION

In conventional filtering methods, filter processing only considers a single reconstructed image frame at a time. The motion-vector information available at both the encoder and decoder is not used. If two adjacent blocks share the same motion vector with respect to the same reference image frame, (for a multiple reference frames system) there may be no significant difference between the image residuals of each block. The block boundary of these two adjacent blocks may have been filtered in the reference frame and should therefore not be filtered again for the current frame. If a deblock filter is used without considering this motion-vector information, the conventional filtering process might filter the same boundary again and again from frame to frame. This unnecessary filtering not only causes unnecessary blurring but also results in extra filter computations.

Figure 1:
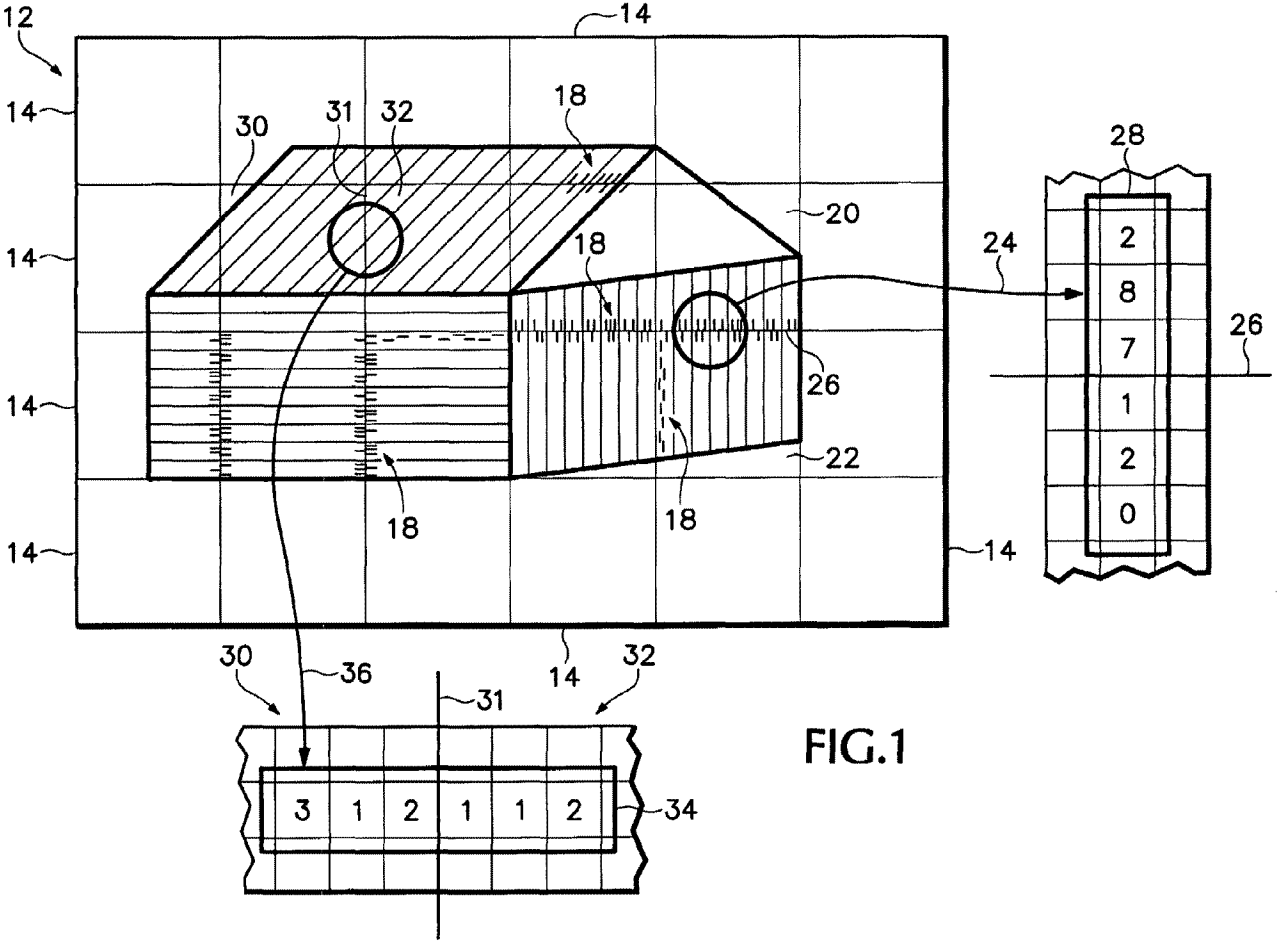
FIG. 1 is a diagram showing how deblock filtering is selectively skipped according to similarities between adjacent image blocks.

FIG. 1 shows an image 12 that selectively filters block artifacts according to similarities between image blocks. The image 12 includes multiple image blocks 14 that are each individually encoded before being stored, transmitted, etc. The borders between some of the blocks 14 include blocking artifacts 18. Blocking artifacts are any image discontinuities between blocks 14 that may be created by the encoding process. A low pass filter is used to reduce the blocking artifacts that exist at the borders of adjacent image blocks.

For example, blocking artifacts 24 exist between blocks 20 and 22. A low pass filter is used at the border 26 between blocks 20 and 22 to remove or reduce the blocking artifacts 24. The low pass filter in one example selects a group of pixels 28 from both sides of the border 26. An average pixel value is derived from the group of pixels 28. Then each individual pixel is compared to the average pixel value. Any pixels in group 28 outside of a predetermined range of the average pixel value is then replaced with the average pixel value.

As described above, if there are little or no blocking artifacts 24 between the adjacent pixels, then the group of pixels 28 may be needlessly filtered causing blurring in the image and wasting processing resources. A skip mode filtering scheme uses the motion estimation and compensation information for adjacent image blocks. If the motion estimation and compensation information is similar, deblock filtering is skipped. This not only avoids unnecessary image blurring but also significantly reduces the required number of filtering operations.

For example, it is determined during the encoding process that adjacent image blocks 30 and 32 have similar coding parameters. Accordingly, deblock filtering is skipped for the groups of pixels 34 that extend across the border 31 between adjacent blocks 30 and 32. Skip mode filtering can be used for any horizontal or vertical boundary between any adjacent blocks in image 12.

Figure 2:
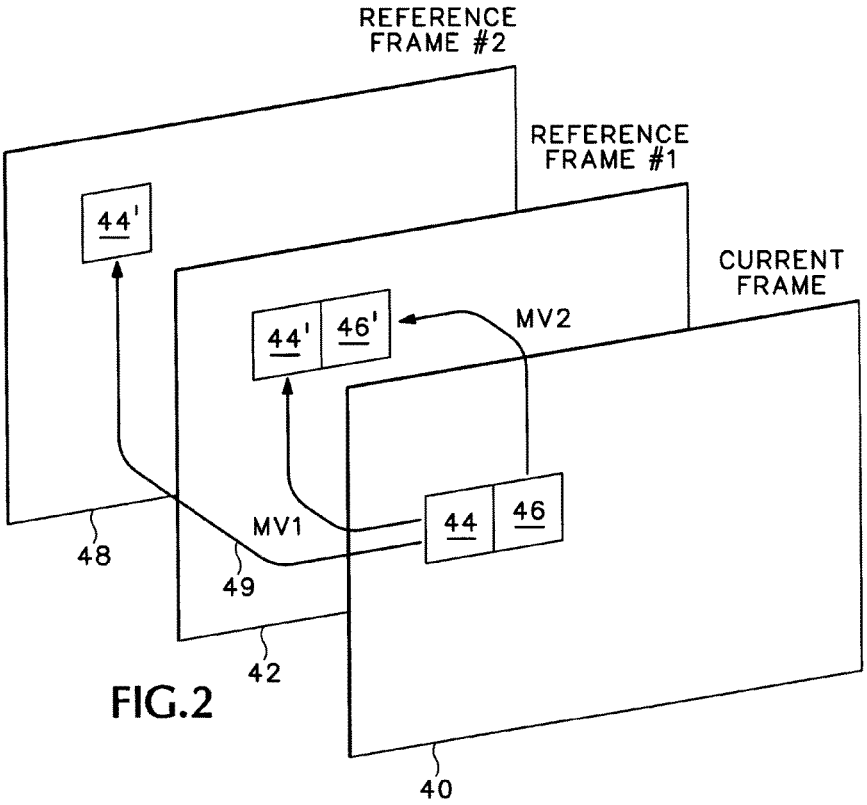
FIG. 2 is a diagram showing two adjacent image blocks having similar motion vectors.

FIG. 2 shows reference frames 42 and 48 and a current frame 40 that is currently being encoded or decoded. Coding parameters for blocks 44 and 46 are compared to determine whether deblock filtering should be skipped between the two adjacent blocks 44 and 46. One encoding parameter that is compared is the Motion Vectors (MV) for the blocks 44 and 46.

The motion vector MV1 points from block 44 in current image frame 40 to an associated block 44' in the reference image 42. The motion vector MV2 points from block 46 in current image frame 40 to an associated block 46' in reference frame 42. Skip mode filtering checks to see if the motion vectors MV1 and MV2 point to adjacent blocks in the same reference frame 42. If the motion vectors point to adjacent blocks in the reference frame (MV1=MV2), then deblock filtering is skipped. This motion vector information may be used along with other coding information to decide whether to skip deblock filtering between the two image blocks 44 and 46.

More than one reference frame may be used during the encoding and decoding process. For example, there may be another reference frame 48. The adjacent blocks 44 and 46 may have motion vectors pointing to different reference frames. In one embodiment, the decision to skip deblock filtering depends on whether the motion vectors for the two adjacent blocks point to the same reference frame. For example, image block 44 may have a motion vector 49 pointing to reference frame 48 and image block 46 may have the motion vector MV2 pointing to reference frame 42. Deblock filtering is not skipped in this example because the motion vectors 49 and MV2 point to different reference frames.

Figure 3:
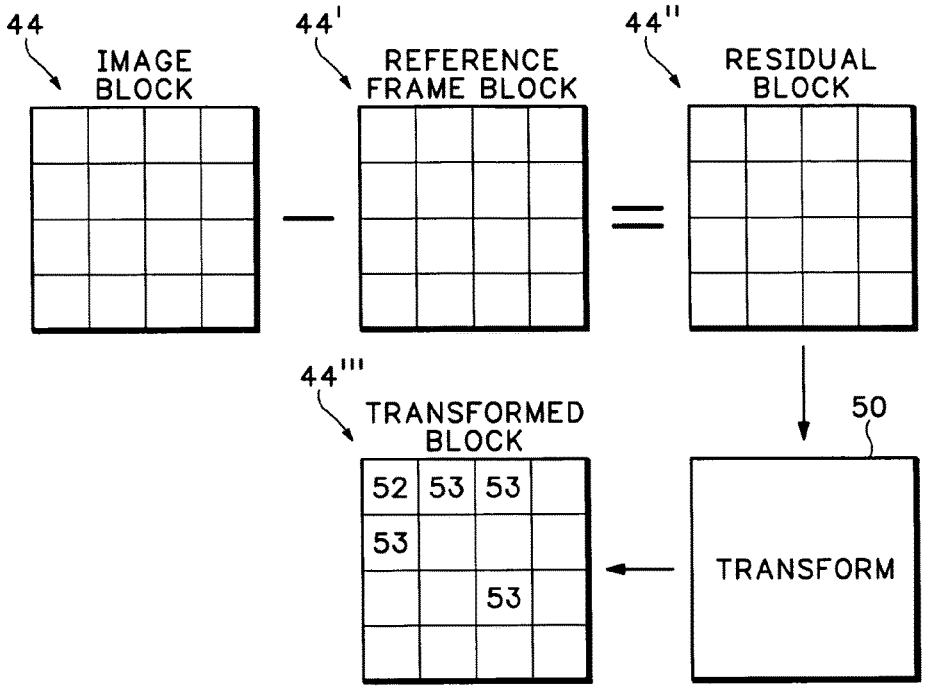
FIG. 3 is a diagram showing how transform coefficients are identified for one of the image blocks.

FIG. 3 shows another coding parameter that may be used to decide whether or not to skip deblock filtering. The image block 44 from image frame 40 is compared with reference block 44' from the reference frame 42 pointed to by the motion vector MV1 as previously shown in FIG. 2. A residual block 44" is output from the comparison between image block 44 and reference block 44'. A transform 50 is performed on the residual block 44" creating a transformed block 44'" of transform coefficients. In one example, the transform 50 is a Discrete Cosine Transform. The transformed block 44'" includes a D.C. component 52 and A.C. components 53.

The D.C. component 52 refers to a lowest frequency transform coefficient in image block 44. For example, the coefficient that represents the average energy in the image block 44. The A.C. components 53 refer to the transform coefficients that represent the higher frequency components in the image block 44. For example, the transform coefficients that represent the large energy differences between pixels in the image block 44.

Figure 4:
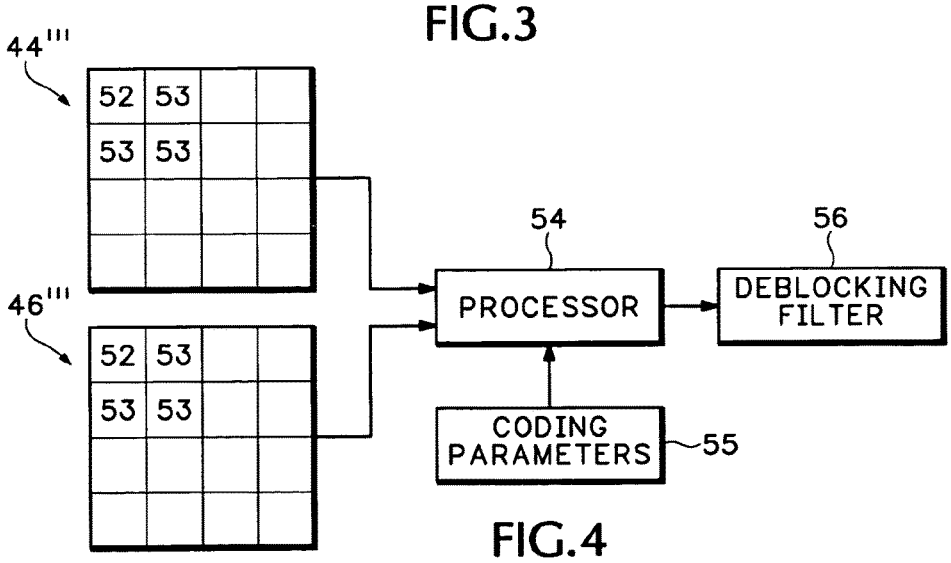
FIG. 4 is a diagram showing how residual transform coefficients are compared between two adjacent image blocks.

FIG. 4 shows the transformed residual blocks 44'" and 46'". The D.C. components 52 from the two transformed blocks 44'" and 46'" are compared in processor 54. If the D.C. components are the same or within some range of each other, the processor 54 notifies a deblock filter operation 56 to skip deblock filtering between the border of the two adjacent blocks 44 and 46. If the D.C. components 52 are not similar, then no skip notification is initiated and the border between blocks 44 and 46 is deblock filtered.

In one embodiment, skip mode filtering is incorporated into the Telecommunications Sector of the International Telecommunication Union (ITU-T) proposed H.26L encoding scheme. The H.26L scheme only uses 4×4 integer Discrete Cosine Transform (DCT) blocks. Here, only the D.C. component of the two adjacent blocks may be checked. However some limited low frequency A.C. coefficients could also be checked when the image blocks are bigger sizes, such as 8×8 or 16×16 blocks. For example, the upper D.C. component 52 and the three lower frequency A.C. transform coefficients 53 for block 44'" may be compared with the upper D.C. component 52 and three lower frequency A.C. transform coefficients 53 for block 46'". Different combinations of D.C. and/or low frequency A.C. transform coefficients can be used to identify the relative similarity between the two adjacent blocks 44 and 46.

The processor 54 can also receive other coding parameters 55 that are generated during the coding process. These coding parameters include the motion vectors and reference frame information for the adjacent blocks 44 and 46 as described above. The processor 54 uses all of these coding parameters to determine whether or not to skip deblock filtering between adjacent image blocks 44 and 46. Other encoding and transform functions performed on the image may be carried out in the same processor 54 or in a different processing circuit. In the case where all or most of the coding is done in the same processor, the skip mode is simply enabled by setting a skip parameter in the filtering routine.

Figure 5:
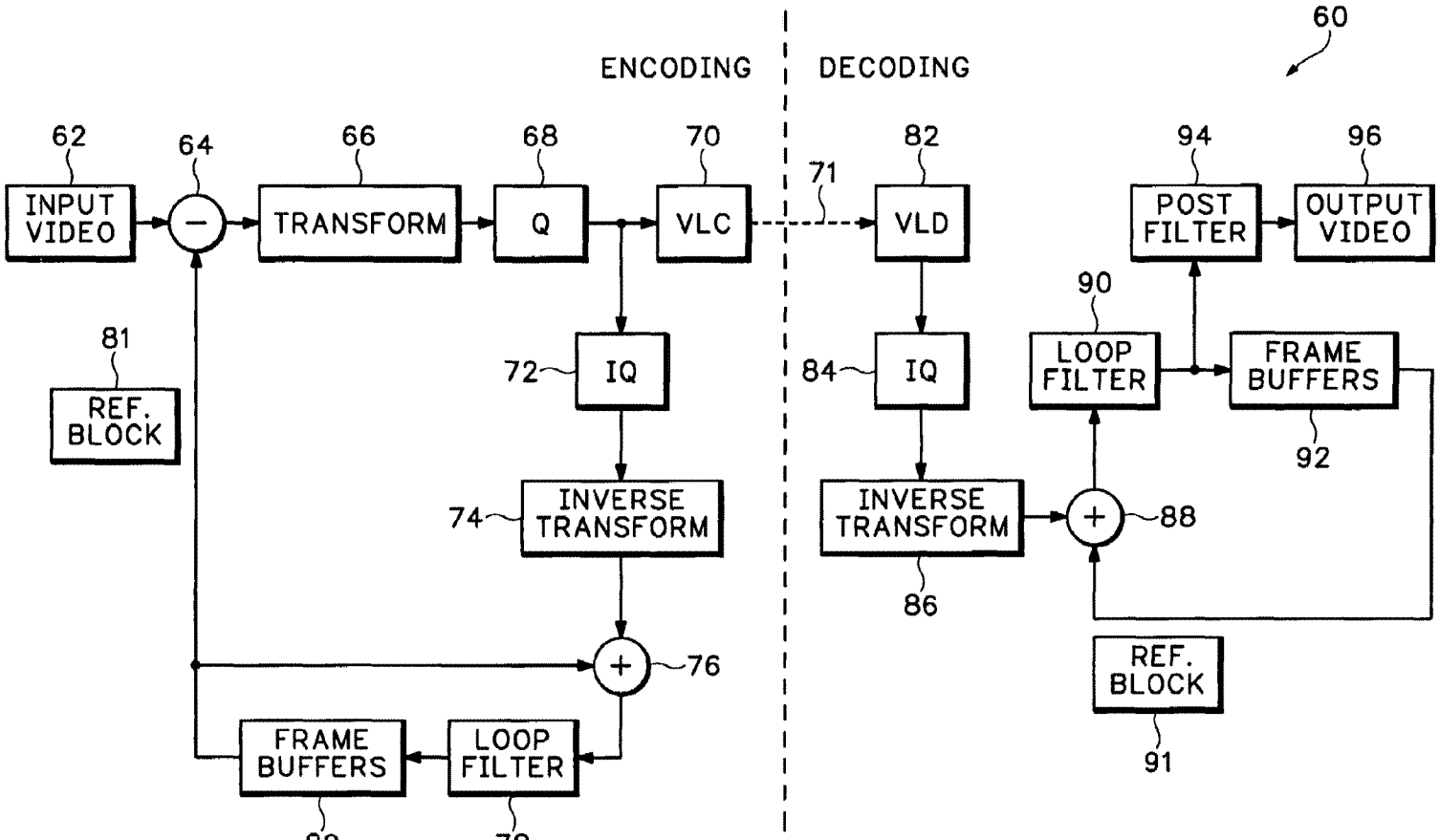
FIG. 5 is a block diagram showing how the video image is encoded and decoded.

FIG. 5 shows how skip mode filtering is used in a block-based motion-compensated Coder-Decoder (Codec) 60. The codec 60 is used for inter-frame coding. An input video block from the current frame is fed from box 62 into a comparator 64. The output of a frame buffering box 80 generates a reference block 81 according to the estimated motion vector (and possible reference frame number). The difference between the input video block and the reference block 81 is transformed in box 66 and then quantized in box 68. The quantized transform block is encoded by a Variable Length Coder (VLC) in box 70 and then transmitted, stored, etc.

The encoding section of the codec 60 reconstructs the transformed and quantized image by first Inverse Quantizing (IQ) the transformed image in box 72. The inverse quantized image is then inverse transformed in box 74 to generate a reconstructed residual image. This reconstructed residual block is then added in box 76 to the reference block 81 to generate a reconstructed image block. Generally the reconstructed image is loop filtered in box 78 to reduce blocking artifacts caused by the quantization and transform process. The filtered image is then buffered in box 80 to form reference frames. The frame buffering in box 80 uses the reconstructed reference frames for motion estimation and compensation. The reference block 81 is compared to the input video block in comparator 64. An encoded image is output at node 71 from the encoding section and is then either stored or transmitted.

In a decoder portion of the codec 60, a variable length decoder (VLD) decodes the encoded image in box 82. The decoded image is inverse quantized in box 84 and inverse transformed in box 86. The reconstructed residual image from box 86 is added in the summing box 88 to the reference block 91 before being loop filtered in box 90 to reduce blocking artifacts and buffered in box 92 as reference frames. The reference block 91 is generated from box 92 according to the received motion vector information. The loop filtered output from box 90 can optionally be post filtered in box 94 to further reduce image artifacts before being displayed as a video image in box 96. The skip mode filtering scheme can be performed in any combination of the filtering functions in boxes 78, 90 and 94.

The motion estimation and compensation information available during video coding are used to determine when to skip deblock filtering in boxes 78, 90 and/or 94. Since these coding parameters are already generated during the encoding and decoding process, there are no additional coding parameters that have to be generated or transmitted specially for skip mode filtering.

Figures 6, 7:
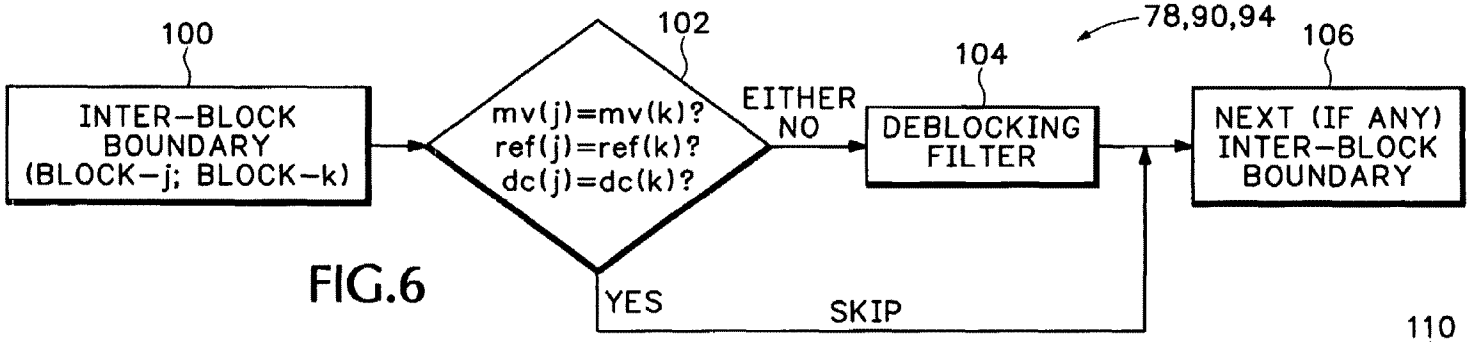
FIG. 6 is a block diagram showing how deblock filtering is selectively skipped in a codec.
FIG. 7 shows a table containing the results from selective deblock filter skipping.

FIG. 6 shows is further detail how skip mode filtering is used in the filters 78, 90, and/or 94 in the encoder and decoder in FIG. 5. The interblock boundary between any two adjacent blocks "j" and "k" is first identified in box 100. The two blocks may be horizontally or vertically adjacent in the image frame. Decision box 102 compares the motion vector mv(j) for block j with the motion vector mv(k) for block k. It is first determined whether the two adjacent blocks j and k have the same motion vector pointing to the same reference frame. In other words, the motion vectors for the adjacent blocks point to adjacent blocks (mv(j)=mv(k)) in the same reference frame (ref(j)=ref(k)).

It is then determined whether the residual coefficients for the two adjacent blocks are similar. If there is no significant difference between the image residuals of the adjacent blocks, for example, the two blocks j and k have the same of similar D.C. component (dc(j)=dc(k)), then the deblock filtering process in box 104 is skipped. Skip mode filtering then moves to the next interblock boundary in box 106 and conducts the next comparison in decision box 102. Skip mode filtering can be performed for both horizontally adjacent blocks and vertically adjacent blocks.

In one embodiment, only the reference frame and motion vector information for the adjacent image blocks are used to determine block skipping. In another embodiment, only the D.C. and/or A.C. residual coefficients are used to determine block skipping. In another embodiment, the motion vector, reference frame and residual coefficients are all used to determine block skipping.

The skip mode filtering scheme can be applied to spatially sub-sampled chrominance channels. For example in a case with 4:2:0 color format sequences, skip mode filtering for block boundaries may only rely on the equality of motion vectors and D.C. components for the luminance component of the image. If the motion vectors and the D.C. components are the same, deblock filtering is skipped for both the luminance and chrominance components of the adjacent image blocks. In another embodiment, the motion vectors and the D.C. components are considered separately for each luminance and chrominance component of the adjacent blocks. In this case, a luminance or chrominance component for adjacent blocks may be deblock filtered while the other luminance or chrominance components for the same adjacent blocks are not deblock filtered.

FIG. 7 includes a table 110 showing the results of skip mode filtering using a ITU-TH.26L Testing Model-Long TML5.0. Table 110 compares the results of the TML filtering standard with skip mode filtering as described above. Encoding results using skip mode filtering are shown in table 110 under the heading SLA.

There were four images that were tested, Akiyo_cif for 300 frames at 30 Frames Per Second (fps), Foreman_cif for 300 frames at 30 fps, Foreman_qcif for 100 frames at 10 fps, and Tempete_cif for 260 frames at 30 fps. Quantization Parameters (QP) of 25 and 30 were used. The results show no significant visual quality degradation with the skip mode filtering. The Picture Signal to Noise Ratio (PSNR) for the images stays approximately the same for the luminance Y and chrominance U and V channels. However, skip mode filtering provides time savings of 40-70 percent.

Skip mode filtering can be used with any system that encodes or decodes multiple image frames. For example, DVD players, video recorders, or any system that transmits image data over a communications channel, such as over television channels or over the Internet.

The skip mode filtering described above can be implemented with dedicated processor systems, micro controllers, programmable logic devices, or microprocessors that perform some or all of the operations. Some of the operations described above may be implemented in software and other operations may be implemented in hardware.

For the sake of convenience, the operations are described as various interconnected functional blocks or distinct software modules. This is not necessary, however, and there may be cases where these functional blocks or modules are equivalently aggregated into a single logic device, program or operation with unclear boundaries. In any event, the functional blocks and software modules or described features can be implemented by themselves, or in combination with other operations in either hardware or software.

Having described and illustrated the principles of the invention in a preferred embodiment thereof, it should be apparent that the invention may be modified in arrangement and detail without departing from such principles. Claim is made to all modifications and variation coming within the spirit and scope of the following claims.

The invention claimed is:

[1. A method for encoding an image, comprising:

identifying spatially adjacent blocks in a same frame of the image;

identifying transform coefficients for the spatially adjacent blocks in the same frame of the image;

comparing the transform coefficients between the spatially adjacent blocks in the same frame of the image;

skipping deblock filtering for removing image residuals caused by encoding the image when the comparison indicates that the spatially adjacent blocks in the same frame of the image have same or similar transform coefficients; and deblock filtering to remove image residuals between the identified spatially adjacent blocks when the comparison between the transform coefficients for the identified spatially adjacent blocks in the same frame of the image indicate that the spatially adjacent blocks do not have the same or similar transform coefficients.]

[2. A method according to claim 1 including:

identifying D.C. components in the transform coefficients;

comparing the D.C. components for the spatially adjacent blocks with each other; and skipping deblock filtering between the spatially adjacent blocks when the D.C. components for the compared spatially adjacent blocks have same or similar values relative to each other.]

[3. A method according to claim 1 including:

identifying both D.C. and A.C. components in the transform coefficients;

comparing the D.C. components for adjacent blocks and A.C. components for adjacent blocks; and skipping deblock filtering between the adjacent blocks when both the D.C. components are the same or similar and the A.C. components are the same or similar.]

[4. A method according to claim 1 including controlling deblock filtering for a loop filter in an image coder.]

[5. A method according to claim 1 including controlling deblock filtering in one or both of a loop filter and a post filter in an image decoder.]

[6. A method according to claim 1 including:

identifying similarities between coding parameters in a luminance channel of the adjacent blocks; and controlling deblock filtering for both the luminance channel and a chrominance channel in the image according to identified similarities in the luminance channel.]

[7. A method according to claim 1 including selectively skipping deblock filtering in any one of a H.261, H.263, H263+, MPEG-1, MPEG-2, or H26L encoding standard according to encoding parameter similarities between adjacent image blocks.]

[8. An encoder for encoding an image, comprising: a processor adapted to:

compare blocks in a same image frame with reference frames;

transform a result of the comparison between the reference frames and the blocks in the image frame into transformed blocks having transform coefficients;

compare are the similarities between the transform coefficients for spatially adjacent transformed blocks within the same image frame; and skipping deblock filtering between spatially adjacent transformed blocks in the image that have the same or similar transform coefficients.]

[9. An encoder according to claim 8 wherein the processor is adapted to identify motion vectors and associated reference frames for the adjacent blocks and skip deblock filtering between the spatially adjacent blocks according to the identified motion vectors and reference frames.]

[10. An encoder according to claim 8 wherein the processor is adapted to identify residual coefficients for the spatially adjacent blocks and skip deblock filtering according to the identified residual coefficients.]

[11. An encoder according to claim 8 wherein the processor is adapted to skip deblock filtering according to both D.C. and A.C. components in the residual coefficients.]

[12. A decoder for decoding an encoded image, comprising:

a processor adapted to identify spatially adjacent blocks in the encoded image;

identify coding parameters including D.C. coefficients for the spatially adjacent blocks within a same encoded image frame;

compare the identified D.C. coefficients between the identified spatially adjacent blocks; and enable or disable filtering of blocking artifacts between the spatially adjacent blocks according to the comparison of the D.C. coefficients between the spatially adjacent blocks within the same encoded image frame.]

[13. A decoder according to claim 12 wherein the processor is adapted to identify both D.C. coefficients and A.C. coefficients for the spatially adjacent blocks within a same encoded image frame;

compare the identified D.C. coefficients between the identified spatially adjacent blocks and corn are the identified A.C. coefficients between the identified spatially adjacent blocks; and enable or disable filtering of blocking artifacts between the spatially adjacent blocks according to the comparison of the D.C. coefficients between the adjacent blocks within the same encoded image frame and according to the comparison of the A.C. coefficients between the adjacent blocks within the same encoded image frame.]

[14. A decoder according to claim 12 wherein the processor is adapted to identify residual coefficients for the spatially adjacent blocks and skip deblock filtering between the spatially adjacent blocks according to the identified residual coefficients.]

[15. A decoder according to claim 12 wherein the processor is adapted to inverse transform the encoded image, compare blocks in the inverse transformed encoded image with reference frames, generate a reconstructed image from the comparison between the inverse transformed encoded image and the reference frame, and skip deblock filtering between spatially adjacent blocks in the reconstructed image according to the coding parameters for the spatially adjacent blocks.]

[16. A decoder according to claim 15 wherein the coding parameters include transform coefficients, motion vectors, and reference frame information and the processor skips deblock filtering when the transform coefficients, motion vectors, and reference frame information for the spatially adjacent blocks are the same or similar.]

[17. A decoder according to claim 12 wherein the processor is adapted to skip deblock filtering in one or both of a loop filter and a post filter.]

*18. An image decoding method, comprising:*

*storing reference images for an image to be decoded, the stored reference images being for motion compensation prediction of the image to be decoded;*

*obtaining a reference block from the stored reference images according to a motion vector;*

*decoding an image from the reference block and a decoded difference block;*

*generating a reconstructed image based on the decoding; and*

*judging whether or not to execute deblock filtering for each boundary between adjacent blocks in the reconstructed image with respect to each of a luminance channel and a chrominance channel for the adjacent blocks, wherein*

*the judging includes determining, with respect to one of the luminance channel or the chrominance channel for the adjacent blocks, whether or not motion vec-*

*tors of the adjacent blocks are equal to each other as well as whether or not the motion vectors of the adjacent blocks point to the same reference image, and*

*in response to determining that the motion vectors of the adjacent blocks are not equal to each other and do not point to the same reference image, executing deblock filtering for a boundary of the adjacent blocks in the reconstructed image corresponding to the luminance channel and a boundary of the adjacent blocks in the reconstructed image corresponding to the chrominance channel.*

* * * * *